(12) United States Patent
Xie et al.

(10) Patent No.: US 8,322,228 B2
(45) Date of Patent: Dec. 4, 2012

(54) METHOD OF MEASURING FLOW PROPERTIES OF A MULTIPHASE FLUID

(75) Inventors: Cheng-gang Xie, Sawston (GB); Songming Huang, Hardwick (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 290 days.

(21) Appl. No.: 12/636,166

(22) Filed: Dec. 11, 2009

(65) Prior Publication Data

US 2011/0138928 A1 Jun. 16, 2011

(51) Int. Cl.
*G01F 1/74* (2006.01)
(52) U.S. Cl. .................................................... 73/861.04
(58) Field of Classification Search ............... 73/861.01; 324/238, 640
See application file for complete search history.

(56) References Cited

U.S. PATENT DOCUMENTS

| | | | | |
|---|---|---|---|---|
| 4,312,234 | A | * | 1/1982 | Rhodes et al. ............. 73/861.04 |
| 5,049,823 | A | * | 9/1991 | Castel et al. ................... 324/640 |
| 6,658,944 | B2 | * | 12/2003 | Melnikov et al. .......... 73/861.04 |
| 6,831,470 | B2 | | 12/2004 | Xie et al. |
| 7,562,587 | B2 | | 7/2009 | Atkinson et al. |
| 7,607,358 | B2 | | 10/2009 | Atkinson et al. |
| 7,650,799 | B2 | * | 1/2010 | Atkinson et al. ........... 73/861.52 |
| 2008/0223146 | A1 | | 9/2008 | Atkinson et al. |
| 2009/0204346 | A1 | | 8/2009 | Xie |
| 2010/0097057 | A1 | * | 4/2010 | Karpen ......................... 324/238 |
| 2010/0299088 | A1 | | 11/2010 | Huang et al. |

FOREIGN PATENT DOCUMENTS

| | | |
|---|---|---|
| GB | 2359435 B | 5/2002 |
| GB | 2376074 B | 2/2004 |
| GB | 2426579 B | 1/2008 |
| GB | 2430493 B | 4/2008 |
| GB | 2447490 A | 9/2008 |
| GB | 2450182 A | 12/2008 |
| WO | 2009071870 A1 | 6/2009 |

OTHER PUBLICATIONS

Kjetil Folgerø et al., "Permittivity measurement of thin liquid layers using open-ended coaxial probes," Meas. Sci. Technol., 1996, vol. 7: pp. 1164-1173.

Xie, "Measurement of Multiphase Flow Water Fraction and Water-cut," American Institute of Physics Conference Proceedings, 2007, vol. 914: pp. 232-239. Article first presented at the Proceedings of the 5th International Symposium on Measurement Techniques for Multiphase Flows, (5th ISMTMF), Macau, China, Dec. 10-13, 2006.

* cited by examiner

*Primary Examiner* — Jewel V Thompson

(57) ABSTRACT

A method and system for measuring a property of a multiphase fluid comprising a mixture of at least an oil phase and a water phase travelling through a conduit, the method comprising measuring the thickness of the liquid mixture, measuring the permittivity of a portion of the multiphase fluid, combining the thickness measurement with the permittivity measurement to obtain a derived value for the permittivity of the liquid mixture, and using at least the derived permittivity of the liquid mixture and a relationship between a single phase liquid property and a corresponding two-phase property of the liquid mixture, to obtain a calculated water-to-liquid ratio of the liquid mixture.

29 Claims, 6 Drawing Sheets

METHOD OF MEASURING FLOW PROPERTIES OF A MULTIPHASE FLUID

TECHNICAL FIELD

The invention relates to a multiphase flowmeter for measuring properties of a fluid comprising a mixture of a gas phase, an oil phase and a water phase, and to a method of measuring such fluid properties.

BACKGROUND

It is desirable during the production of oil and gas to carry out flow measurements to determine the flow properties of individual phases of multiphase flow. In particular, measurement of the flow rates of e.g. oil, gas and water in a conduit, such as a pipe, is highly desirable.

However, in general it is very difficult to obtain measurements of the flow of the different phases when they flow simultaneously through a pipe.

This difficulty is primarily due to the wide variety of flow regimes such a multiphase flow can take. For example, the three phases can be well mixed together with one as the continuous phase and the other two dispersed within it. Mostly there may be phase separation between gas and liquid with the liquid often moving at a much lower velocity than the gas.

When gas is the dominant phase, a commonly encountered flow regime is for the gas to travel along the centre of the pipe with dispersed droplets of oil and water within it, whilst the majority of the oil and water travels along the pipe wall which itself may comprise entrained gas bubbles.

Additionally, flow phase and velocity distributions may alter both spatially and temporally. Sudden or gradual variation in flow rates of one phase or another may cause a change in flow regime. Also, due to the high pressure encountered deep underground, a flow which is mixed or in bubble-flow can become dominated by a discernible high gas-fraction flow as the pressure drops nearer the surface and the gas expands and/or comes out of solution.

Multiphase flowmeters are available and have been suggested in the prior art. However, these operate to give accurate readings only for particular flow regimes.

For example, GB 2426579 and GB 2450182 teach the use of an optical system using two wavelengths of light, one which is water-absorbing and one which is substantially not. By analysing the transmitted light and scattered light at both wavelengths, information on water content is obtainable. Flow rates may also be obtained by analysing transmitted and/or scattered signals measured by duplication of the sensors axially spaced. However, this system only works well for flow regimes with very high gas volume fractions (GVF>~99%), typically with very thin (i.e. <1 mm) liquid layers flowing on the pipe wall and/or with a gas flow at the centre which may contain entrained liquid droplets. At lower gas volume fractions (GVF) a thicker liquid layer can prevent any transmission of light across the pipe, preventing measurements from being taken.

WO 2009/071870 teaches the use of pulsed echo ultrasound to measure the thickness of a separated liquid layer at the pipe without needing to know the speed of sound in the liquid by comparing echoes received from two transducers, one of which is aligned perpendicular to the pipe wall and the other aligned at an angle to the pipe wall. Flow velocities of the liquid layer may be obtainable from the use of pulsed Doppler ultrasound, together with a measure of the speed of sound in the liquid. The speed of sound in the gas-free liquid can be used to infer the water fraction of the liquid, or the water-to-liquid ratio (WLR). However, as the speed of sound in oil and water can be somewhat similar, this measure of water fraction tends to be inaccurate.

The use of electromagnetic methods, such as microwaves, has also been suggested. GB 2376074 teaches the use of a microwave open-ended coaxial reflection probe flush-mounted on the pipe wall to measure the mixture permittivity and mixture conductivity of liquid-layer to obtain an estimate of water conductivity, as well as an estimate of the water-to-liquid ratio if the liquid layer is substantially free from entrained gas and has a thickness higher than the probe's depth of investigation.

However, at high gas volume fractions, when the thickness of the liquid at the wall of the pipe becomes thin and less than the sensitivity depth of the probe in most instance of time, the probe can also inadvertently measure the properties of the adjacent gas core, providing erroneous results in the water-to-liquid ratio.

GB 2430493 utilises a transmission electromagnetic approach, as opposed to a reflective electromagnetic approach, in combination with venturi and gamma radiation sensors. The transmission microwaves are used to measure the mixture permittivity and mixture conductivity across the whole of the pipe. The gamma rays are employed to measure the average fluid density across pipe, which is used to infer the gas-to-liquid ratio. By employing density and permittivity and/or conductivity mixing rules, measures of water fraction, oil fraction and gas fraction, and hence estimate of the water-to-liquid ratio, can be obtained. The measured venturi differential pressure and/or further microwave sensors in the venturi can be used to provide flow rate and/or velocity data.

However, at very high gas volume fractions, the microwave transmission approach produces low values of bulk mixture permittivity and mixture conductivity, due to, for example, the thin liquid layer at the pipe wall, and so derived phase-fraction quantities can become inaccurate. Additionally gamma-ray measurement methods are also less accurate at high gas volume fractions, and are undesirable because of environmental and regulatory restrictions on their use.

SUMMARY

In a first aspect, the invention relates to a method of measuring a property of a multiphase fluid, the multiphase fluid including a gas phase and a liquid phase and the liquid phase comprising at least one of oil and water, travelling through a conduit, wherein the liquid phase travels substantially along an inside-wall of the conduit, the method comprising measuring a thickness and the axial velocity of the liquid phase, measuring a permittivity of a portion of the multiphase fluid, combining the thickness measurement with the permittivity measurement to obtain a derived value for the permittivity of the liquid phase, and using at least the derived permittivity of the liquid phase and a relationship between a single phase liquid property and a corresponding two-phase property of the liquid mixture, to obtain a calculated water-to-liquid ratio of the liquid phase. Note that, unless stated, the permittivity herein means the complex permittivity of a fluid, having a real part representing electrical-insulation property of the fluid (i.e. the dielectric constant), and an imaginary part representing electrical-conduction property of the fluid (i.e. the conductivity).

By directly measuring the thickness of the liquid phase, accurate values of the permittivity of the liquid phase may be obtained from measured values of permittivities of a portion of the whole fluid containing gas, regardless of the thickness of the liquid phase at the wall of the conduit. Thus, multiphase flowmeters utilising this method are provided which can provide accurate measurements over a wide range of gas volume fractions (e.g. from 0% to >99% gas volume fraction). Additionally, this measurement of the multiphase flow in the conduit may be achieved without the use of gamma rays and/or the like.

Embodiments of the present invention are suitable for measuring the flow properties of a multiphase fluid which is flowing through a conduit as an annular in which a large/substantial portion of the liquid phase, which is substantially gas free, of the mixture is flowing along the wall of the conduit, where the flow may be either a conditioned or naturally occurring flow. In annular flow of a multiphase mixture, the flow will generally have a continuous centrally flowing gas phase. Embodiments of the present invention are capable of providing accurate measurements for liquid thickness of from less than 1 mm, all the way up to the condition when there is no longer any continuous gas flow.

Another aspect the of the present invention relates to a multiphase flowmeter for measuring properties of a fluid comprising a mixture of at least an oil phase and a water phase travelling through a conduit, wherein the oil and water phases are travelling substantially along an inside wall of the conduit as a liquid mixture, wherein the flowmeter comprises a sensor for measuring the thickness and the axial velocity of the liquid mixture, a sensor for measuring the permittivity of the multiphase fluid, and a processing means operable to combine the thickness measurement with the permittivity measurement to obtain a derived value for the permittivity of the liquid mixture and then using at least the derived permittivity of the liquid mixture and a relationship between a single phase liquid property and a corresponding two-phase property of the liquid mixture to obtain a calculated water-in-liquid ratio of the liquid mixture.

The processor means may also be operable to combine the measured liquid-layer thickness (liquid fraction) and the calculated water-in-liquid ratio to obtain a calculated liquid density and a calculated gas-liquid mixture density, knowing the densities of the gas, oil and water phases. The processor means may be further operable to combine the measured liquid-layer thickness (liquid fraction) and the measured liquid-layer axial velocity to obtain a calculated liquid flow rate. From the calculated water-in-liquid-ratio and the calculated liquid flow rate, the processor means then further obtain a calculated water flow rate and a calculated oil flow rate.

Embodiments of the invention may include flowing the multiphase fluid through a venturi or the like, which comprises a constriction region providing a reduced conduit cross-section. This enables a differential pressure of the multiphase fluid to be measured as it flows from a region before the constriction to a region inside the constriction. From the measured differential pressure and the calculated gas-liquid mixture density, the processor means can obtain a calculated total flow rate. A gas flow rate can then be calculated by the processor means from the calculated total flow rate and the calculated liquid flow rate.

The differential pressure of the fluid can be measured in numerous other ways known to the person skilled in the art, however the method by the use of the venturi is preferred because of its high pressure recovery factor (i.e. low pressure loss) and robustness against erosion.

To calculate physical properties of fluids such as densities at prevailing conditions, it is also conventional to measure the absolute pressure and temperature of the multiphase fluid by any suitable means known in the art. Conveniently, this is carried out by a pressure sensor in the constriction of the venturi and by a temperature sensor at the downstream or upstream of the constriction of the venturi.

In some embodiments of the present invention the multiphase fluid may be induced to exhibit swirling flow in the constriction region. Examples of inducing swirling flow in a multiphase mixture are discussed in GB 2447490, the entire disclosure of which is incorporated herein for all purposes. This swirling of the multiphase mixture has the effect of separating the liquid and gas by causing the liquid of the mixture to be displaced to the wall of the conduit, e.g. to form an annulus of liquid adjacent to the wall of the conduit. This can improve measurement methods because it reduces or eliminates liquid droplets being present in the central gas flow and gas bubbles being present in the liquid annulus. This separation allows an improved measure of the thickness, the water-in-liquid ratio and the sound velocity of the liquid to provide an accurate measure of the liquid fraction and flow rate of the multiphase fluid.

A method in accordance with an embodiment of the present invention of measuring the thickness and the axial velocity of the liquid mixture is to employ an ultrasonic sensor, typically a pulsed Doppler ultrasound sensor, e.g. by the method disclosed in WO 2009/071870, the entire description of which is incorporated herein for all purposes. Ultrasound can be utilised to probe the thickness of the liquid layer by measuring the time-of-flight between an emitted ultrasound signal and its being received following reflection at the moving liquid/gas interface. By measuring the Doppler frequency shifts caused by the scatters moving in the depth of the liquid layer, the pulsed Doppler ultrasound sensor can measure the axial velocity profile and the Doppler energy profile across the liquid layer, from which the mean liquid-layer axial velocity and the thickness can be derived.

However, a central difficulty with this technique is that knowledge of the speed of sound in the liquid is required in order to convert the measured time-of-flight to a distance, or thickness, measurement. As the liquid contains an as yet unknown mixture of oil, water and possibly gas bubbles, it is not possible to know in advance what the speed of sound will be.

One method of overcoming this difficulty for a relatively large liquid-layer thickness is described in WO 2009/071870, the entire description of which is incorporated herein for all purposes, which one ultrasound transceiver positioned perpendicular to the conduit wall and a second ultrasound transceiver positioned at an angle to perpendicular to the conduit wall. By solving two equations relating to the time-of-flight of the two ultrasound transceivers, the liquid thickness and speed of sound can be estimated.

In another embodiment, the speed of sound can be directly measured e.g. by use of an insertion pulse-echo ultrasound transducer. This involves transmission of an ultrasound signal across a known distance (e.g. a few mm). If the sensor is immersed in liquid, then an accurate reading for the speed of sound in the liquid can be determined. Clearly this requires the thickness of the liquid to exceed the insertion depth of the sensor. Thus, when the flowmeter comprises a venturi, preferably the insertion ultrasound sensor is located on the conduit wall of the venturi inlet section (before the convergent section of the constriction), preferably at the upstream of the inlet pressure port of the venturi differential pressure sensor. This is because it has been found that the liquid layer thickness tends to be high at this location.

As a further possibility, the speed of sound can be estimated from a mixing rule utilising the single phase speeds of sound in oil and in water. This does however, require a prior knowledge of the water fraction in the liquid, or water-in-liquid ratio, which is an unknown quantity.

However, by use of the method of an embodiment of the present invention, it is possible to provide an initial notional water-in-liquid ratio to obtain a notional speed of sound. Once the notional speed of sound is obtained (even though it may differ from the actual speed of sound) the present invention allows a calculated notional water-in-liquid ratio to be determined, as will be discussed below. Once the calculated notional water-in-liquid ratio is determined, it can be compared with the initial notional water-in-liquid ratio and the difference used to obtain a second notional water-in-liquid ratio, which can then be used to obtain a second calculated notional water-in-liquid ratio.

This iterative procedure may continue until the notional water-in-liquid ratio approximately equals the calculated notional water-in-liquid ratio. Once this point is reached, it can be assumed that this is close to the actual water-in-liquid ratio of the liquid.

It is to be noted that, even if the notional water-in-liquid ratio differs significantly from the actual water-in-liquid ratio, given the similar values of the speed of sound in oil and water, the speed of sound estimate will never differ significantly from the actual value. Thus, the low-contrast of ultrasound to distinguish between oil and water becomes one advantageous feature of embodiments of the present invention rather than a disadvantage, as it is in prior art methods.

The permittivity of the multiphase fluid is measured in-line by an electromagnetic method, typically by use of microwaves. A variety of microwave measurement methods may be employed, such as transmission, reflection or resonance methods. The high permittivity contrast between oil and water permits an accurate measurement of the water fraction and hence the water-in-liquid ratio.

In a transmission method, at least a pair of transmission and receiving antennas are used to interrogate the conduit cross-section. By monitoring amplitude attenuation and phase-shift in an appropriate microwave transmission model, the mixture permittivity and mixture conductivity in the transmitting path can be obtained.

In a reflection method an open-ended coaxial probe is positioned flush with the inside wall of the conduit. Rather than interrogating the whole cross-section of the fluid in the conduit, the probe measures the permittivity of fluid in a sensitivity depth, which is about equal to the inner radius of the outer conductor of the probe (typically only a few millimetres). Thus, the probe is sensitive to the bulk electrical properties of a material in its close vicinity.

With a measurement of the gas-liquid mixture permittivity and of the thickness of the liquid layer, it is then possible to derive a value of the permittivity of the liquid layer only. By combining these two measurements, in accordance with the invention described herein, information regarding the liquid layer, such as the water-in-liquid ratio, can be obtained which was not hitherto possible.

A further embodiment of the present invention may include both a transmission and a reflection electromagnetic measurement.

In the case when the liquid layer is quite thick, there is often the possibility of larger drops (e.g. >1 mm in diameter) of oil or water and even the possibility of layering occurring at relatively low flow rates. In this case the reflection electromagnetic method may not give an accurate reading representing the water-in-liquid ratio of the bulk liquid and lead to an erroneous measure of water-in-liquid ratio. On the other hand, the cross-conduit transmission method is much less sensitive to drop size and so would yield a better estimate of the water-in-liquid ratio of the bulk liquid.

Additionally, in the case when the liquid layer is very thin the drop size in the liquid tends to be small due to the high shear environment in the liquid in a high-gas flow. The transmission method will therefore become less accurate as the values of bulk permittivity and conductivity become small. However the reflective probe will function well, as even thin films (i.e. less than 1 mm) will be a significant proportion of the sensitivity depth of the probe, thus yielding accurate information.

It can therefore be seen that by measuring the thickness of the liquid layer to take into account of the effect of gas core, in-line electromagnetic interrogation methods for liquid-property measurement can be significantly improved, and when both transmission and reflection probes are employed accurate liquid-property data for liquid thicknesses of from less than 1 mm up to the whole conduit inner radius, can be obtained.

In order to accurately measure the water fraction and the water-in-liquid ratio it is greatly beneficial to know the conductivity of the water in the multiphase flow, especially when water is the continuous phase of the liquid. Conductivity varies with temperature, salinity and salt species. Without a prior knowledge of the water conductivity, accurate estimates of the water fraction and the water-in-liquid ratio, from the conductivity and/or permittivity of the liquid, are not possible.

This is because the value of the derived liquid conductivity or permittivity is related to the conductivity or permittivity of the constituent water phase, when the water is the continuous liquid phase.

One possibility is for water conductivity data to be entered manually based on water sample analysis, or measured by flowing single-phase water through the sensing volume. However, the water conductivity may be estimated from the measurement of the permittivity and conductivity of the multiphase mixture.

By assuming that the ratio of mixture conductivity to mixture permittivity is substantially equal to the ratio of water conductivity to water permittivity, and knowing the ratio from theoretical or empirical correlations at prevailing temperature and salinity, the conductivity of water can be obtained with knowledge of the relationship between the conductivity of water and the permittivity of water. An example of a suitable method of carrying this out is given in GB 2376074, the entire description of which is incorporated herein for all purposes.

Once the liquid (complex) permittivity is obtained, the water-in-liquid ratio can be obtained by use of a relationship between a single phase liquid property, a corresponding two-phase liquid property and the water-in-liquid ratio. Such a relationship is often referred to as a mixing rule.

Such mixing rules are known in the art and typically ones useful in the present invention utilise permittivity and/or conductivity as the liquid property. For example, preferred relationships provide an estimate of the permittivity or conductivity of a mixed water and oil system from a knowledge of the permittivity or conductivity of the isolated water and oil phases together with the water-to-liquid ratio.

Information regarding whether the liquid phase is water-continuous or oil-continuous can be obtained from liquid conductivity data. In the presence of formation water, the differences in conductivity between oil-continuous and water-continuous liquids is so high, this is a fairly easy task with a rapid sampling rate of electromagnetic transmission and/or reflection measurement.

Once the water-to-liquid ratio has been determined it can be used to adjust the notional water-to-liquid ratio used as a starting point, as discussed above, or if the speed of sound was directly measured, this provides the estimate of the actual water-to-liquid ratio.

A further embodiment of non in-line measurement of liquid properties is to make sound velocity measurement across the diameter of a small-diameter (<5 mm) bypass flowline with its intake-port and discharge-port located at the wall of the conduit of the venturi's inlet section and divergent section, respectively; a gas-free, representative liquid mixture may be made to flow in the bypass line. In the case of achieving a representative gas-absent flowing liquid, the measurement of the permittivity of the liquid in the bypass flowline allows a direct measure of the water-in-liquid ratio of the liquid. Other measurement methods such as optical sensors may be employed in the small-diameter flowline to measure the water-in-liquid ratio.

In a further embodiment, the method further includes the step of measuring the flow rate of the liquid mixture. For example, this can be obtained from the pulsed Doppler ultrasonic sensors, e.g. by the method disclosed in WO 2009/071870, the entire description of which is incorporated herein for all purposes.

Combining the liquid flow rate with the water-in-liquid ratio gives the flow rates of the individual oil and water phases.

When a venturi is used, the gas flow rate can be obtained by the measured differential pressure and the measured liquid flow rates.

In one embodiment, the flowmeter of the present invention comprises both the sensor for measuring the thickness and the axial velocity of the liquid mixture (e.g. the ultrasound sensors) and the sensor for measuring the permittivity of a portion of the multiphase fluid (e.g. the electromagnetic sensors) at the same axial location of the conduit. This is because the flow regime and properties can change with axial position.

The flowmeter is versatile and compact and may be employed in a so-called "clamp-on" fashion, so it can be fitted to an existing pipeline.

BRIEF DESCRIPTION OF THE DRAWINGS

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The invention will now be illustrated, by way of example, with reference to the following figures, in which.

DETAILED DESCRIPTION

Figure 1A:
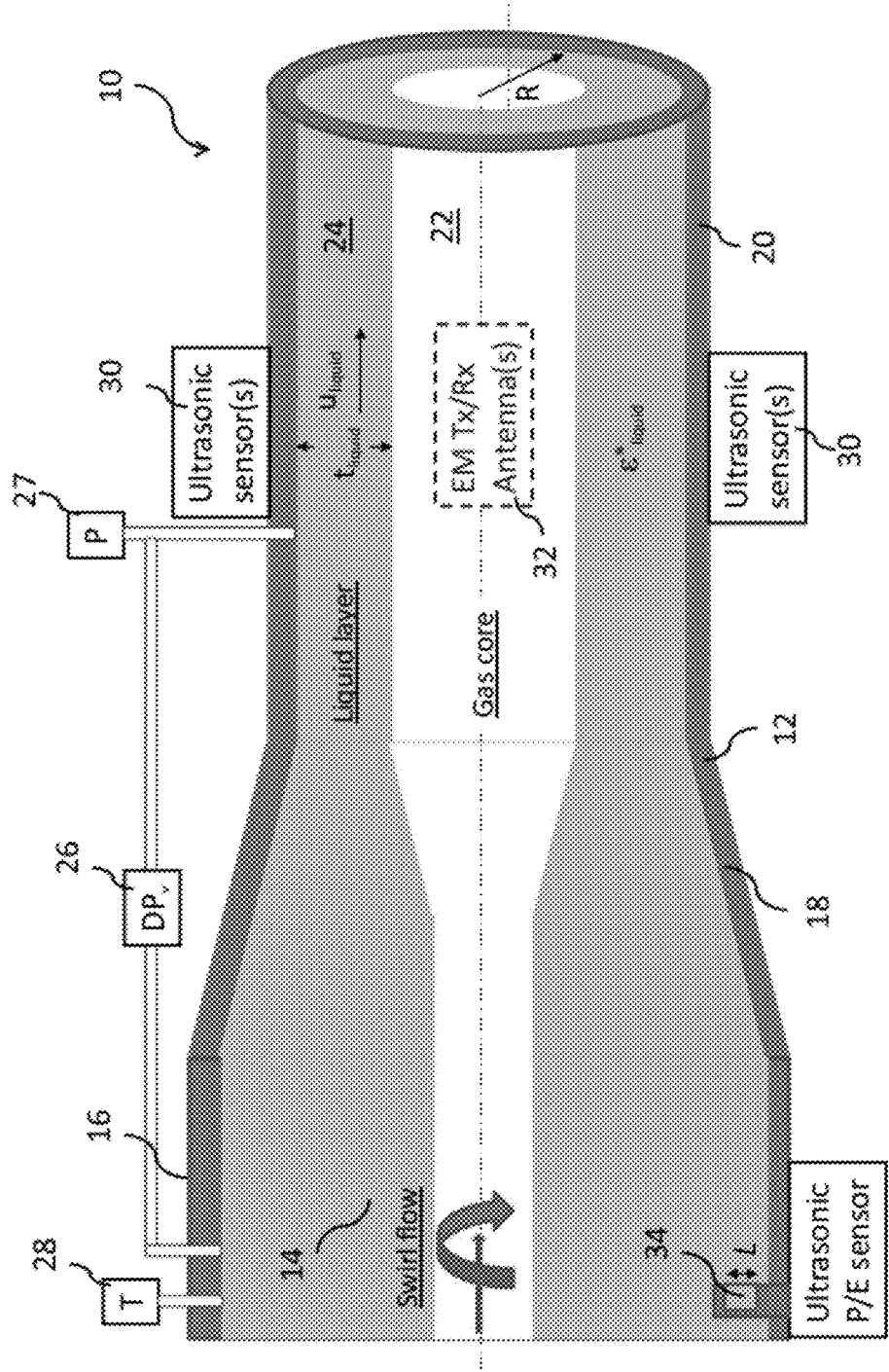
FIG. 1a is a schematic section side view of a multiphase flowmeter, according to an embodiment of the present invention, combined with a conduit comprising a multiphase fluid.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth herein.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

FIG. 1a shows a multiphase flowmeter 10 according to the present invention in combination with a pipe 12 carrying within it a flowing multiphase fluid 14.

The flowmeter 10 comprises a venturi arrangement comprising an inlet portion of the pipe 16, a tapered or convergent portion 18 and a constricted portion 20. The venturi also includes swirling flow inducing means (not shown) which has the effect of separating the multiphase fluid 14 into its separate gas phase 22 in the centre of the pipe 12 and liquid phase 24 travelling along the inside wall of the pipe 12.

The flowmeter 10 measures the differential pressure in the multiphase fluid 14 by taking pressure readings at the inlet region 16 and at the constricted region 20 by employing differential-pressure 26. The pressure of the fluid is measured by pressure sensor 27. The temperature of the fluid is also measured by temperature sensor 28.

The flowmeter 10 also includes a pair of pulse-echo and/or pulsed Doppler ultrasound transducers 30 and also comprises microwave transmission and receiver antennas 32 positioned at the same axial location as the ultrasound sensors. In a preferred embodiment, the flowmeter 10 also includes an ultrasound insertion pulse-echo probe 34 for measuring the speed of sound in-line in the liquid 24.

In use, the ultrasound sensors 30 measure the thickness and the axial velocity of the liquid layer 24 and the microwave transmitter and receiver antennas measure both the permittivity and conductivity of the mixed multiphase fluid of liquid 24 and of gas 22. The results of these two measurements are then combined in accordance with the method of the present invention to obtain a derived value for the permittivity and conductivity of the liquid 24. The mean axial velocity of the liquid 24 is derived by processing pulsed Doppler velocity and energy profiles as disclosed in WO 2009/071870. Microwave Doppler sensors may be used to measure the liquid-layer axial velocity as disclosed in GB 2359435.

The value of the derived permittivity and conductivity of the liquid is then combined with water conductivity information also provided by the microwave sensors 32 and known relationships to obtain an estimate of the water fraction, or water-in-liquid ratio, in accordance with the invention described herein.

Figure 2:
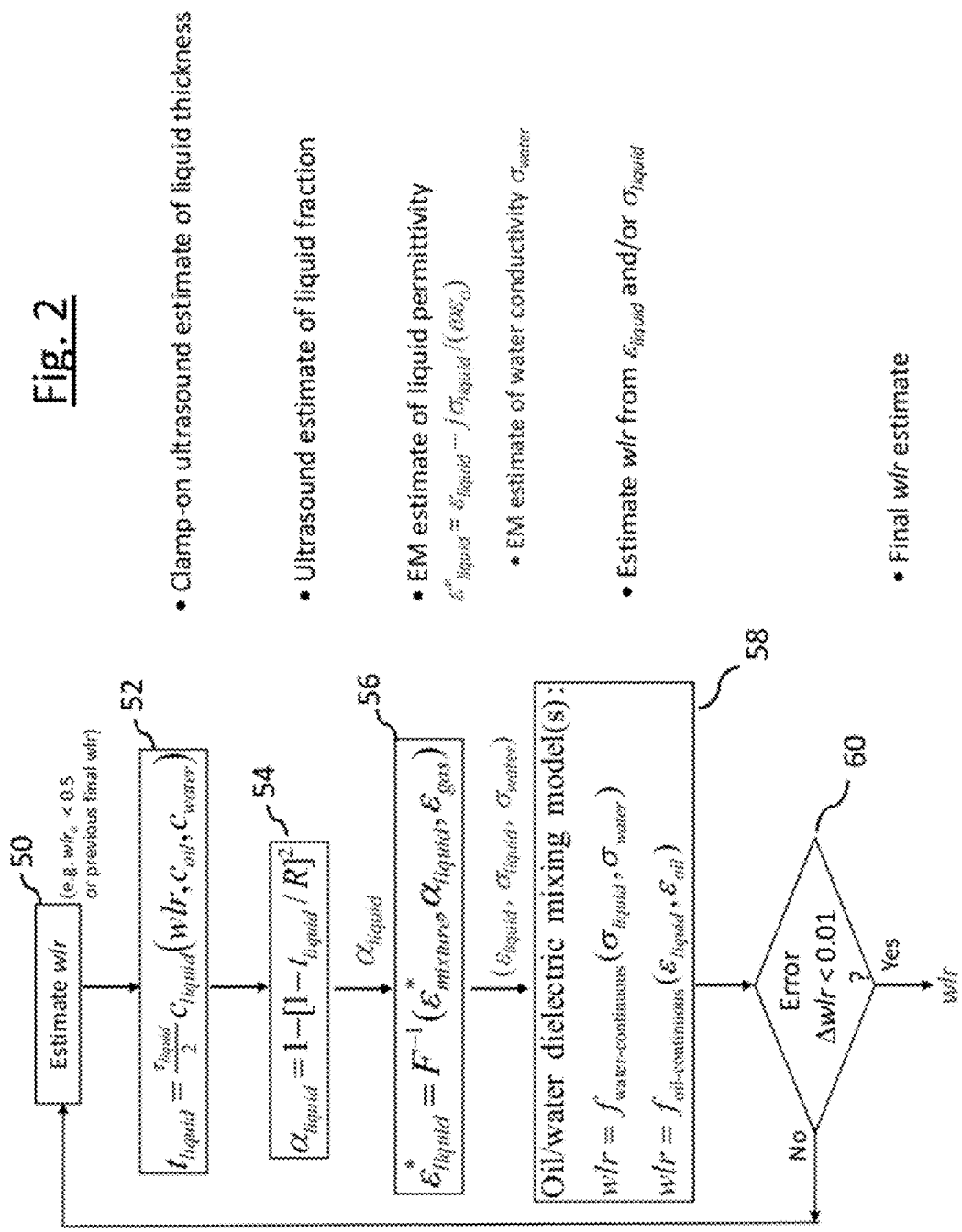
FIG. 2 is a flow chart illustrating a method of measuring a multiphase fluid liquid fraction and water-in-liquid ratio, according to an embodiment of the present invention.

FIG. 2 shows a flowchart, illustrating a first embodiment of the measuring method according to the present invention. The method starts by establishing a notional value of the water-in-liquid ratio, at box 50. Ultrasound measurement means provides a measure of the time-of-flight, $\tau_{liquid}$, of an ultrasound signal passing into the liquid layer at the wall of the conduit, reflecting at the gas/liquid interface and travelling back to the ultrasound sensor. Additionally, with a value, albeit an as yet incorrect value, of the water-in-liquid ratio, wlr, a value for the speed of sound in the liquid, $c_{liquid}$, can be obtained from known mixing rules such as the following:

$$\frac{1}{\rho_{liquid} c_{liquid}^2} = \frac{1-wlr}{\rho_{oil} c_{oil}^2} + \frac{wlr}{\rho_{water} c_{water}^2},$$

where the liquid density is $\rho_{liquid} = (1-wlr)\rho_{oil} + wlr \rho_{water}$.

As shown in box 52, the thickness of the liquid layer, $\tau_{liquid}$, can then be calculated by the following relationship:

$$t_{liquid} = \frac{\tau_{liquid}}{2} c_{liquid}$$

From a knowledge of the thickness of the liquid, a value for the liquid fraction of the multiphase fluid, $\alpha_{liquid}$, can be obtained by assuming that the liquid occupies an annular geometry, as shown in box 54.

Values for the multiphase mixture (complex) permittivity, $\in_{mixture}^*$, are obtained by use of transmission microwave or reflection microwave methods. These measurements are then combined with the liquid fraction $\alpha_{liquid}$ data, together with known relationships for the particular microwave method to obtain a value for the permittivity of the liquid alone $\in_{liquid}^*$ as shown in box 56.

For example, the gas-liquid mixture permittivity obtained from a reflective microwave method using an open-ended coaxial probe can be provided by:

$$\in_{mixture}^* = (\in_{gas} - \in_{liquid}^*) e^{-t_{liquid}/d} + \in_{liquid}^*$$

$\in_{gas}$ can be accurately estimated to within 1% from a measurement of pressure and temperature, d is virtually a constant that is related to the sensitivity depth of the probe. Note that the constituent oil dielectric constant $\in_{oil}$ can be determined a prior (as a relatively weak of function of pressure P and temperature T).

Thus, by rearranging, $$\varepsilon_{liquid}^* = \frac{\varepsilon_{mixture}^* - \varepsilon_{gas} e^{-t_{liquid}/d}}{1 - e^{-t_{liquid}/d}}$$

the complex permittivity of the liquid mixture $\in_{liquid}^*$ can be obtained from the thickness of liquid $t_{liquid}$ and the measured permittivity of the complex mixture $\in_{mixture}^*$. Since at a chosen measurement (angular) frequency ω or a range of ω, the complex liquid permittivity can be explicitly expressed as, $\in_{liquid}^* = \in_{liquid} - j\in_{liquid}/(\omega\in_0)$, we then can derive the explicit liquid-mixture permittivity $\in_{liquid}$ (dielectric constant) and the explicit liquid-mixture conductivity $\sigma_{liquid}$ (measured at ω).

Likewise, the multiphase mixture permittivity $\in_{mixture}$ and mixture conductivity $\sigma_{mixture}$ obtained from transmission microwave transmitter and receiver antennas can be provided by the following mixing rules $$\in_{mixture}^x = \alpha_{liquid} \in_{liquid}^x + (1-\alpha_{liquid}) \in_{gas}^x$$

$$\sigma_{mixture}^y = \alpha_{liquid} \sigma_{liquid}^y$$

$\alpha_{liquid}$ is the liquid fraction of the multiphase fluid and is obtainable from the liquid thickness value by assuming an annular geometry. x and y are empirical exponents with a value of approximately ⅔.

And so the liquid permittivity $\in_{liquid}$ and liquid conductivity can be obtained from a knowledge of the measured mixture permittivity and mixture conductivity and the fraction of the liquid mixture:

$$\varepsilon_{liquid} = \left[\frac{\varepsilon_{mixture}^x - (1-\alpha_{liquid})\varepsilon_{gas}^x}{\alpha_{liquid}}\right]^{1/x}$$

$$\sigma_{liquid} = \frac{\sigma_{mixture}}{(\alpha_{liquid})^{\frac{1}{y}}}$$

Since the microwave measuring technique yields information on the conductivity of the mixture from the measured complex permittivity of the mixture. The mixture conductivity value hence also establishes whether the liquid phase is water-continuous or oil-continuous, according to whether the value of the mixture conductivity is high or low.

The water-in-liquid ratio is then calculated by use of a known mixing model relating the liquid permittivity to the oil or water permittivity and the water-in-liquid ratio. Alternatively, for water-continuous liquids, a mixing model relating the liquid conductivity to the water conductivity and the water-in-liquid ratio can be employed. As shown in box 58 this produces a calculated notional value of water-in-liquid ratio.

For example, for water-continuous liquids, the Ramu-Rao relationship may be used, aviz:

$$\varepsilon_{liquid} = \varepsilon_{water}\frac{2wlr}{3-wlr}$$

$$\sigma_{liquid} = \sigma_{water}\frac{2wlr}{3-wlr}$$

For oil-continuous liquids, the Ramu-Rao relationship may be used, viz:

$$\varepsilon_{liquid} = \varepsilon_{oil}\frac{1+2wlr}{1-wlr}$$

or the Bruggeman relationship may be used:

$$\varepsilon_{liquid} = \varepsilon_{oil}\frac{1}{(1-wlr)^3}$$

As the initial notional value of water-in-liquid ratio as shown in box 50 was an initial guess (or its previous final estimate over a chosen measurement duration typically a few seconds, bearing in mind that in practice the value of water-in-liquid ratio changes a little over a short-time period, say 60 seconds), it may differ from the notional calculated value of water-in-liquid ratio shown in box 58. The difference in the two values is calculated in box 60 and the difference is employed to adjust the notional value of water-in-liquid ratio in box 50 and the procedure is repeated.

This sequence of calculations is repeated iteratively until the initial value of water-in-liquid ratio is within an acceptable tolerance of the calculated water-in-liquid ratio. Once this acceptable tolerance is obtained, a final calculated water-in-liquid ratio estimate is achieved.

Figure 3:
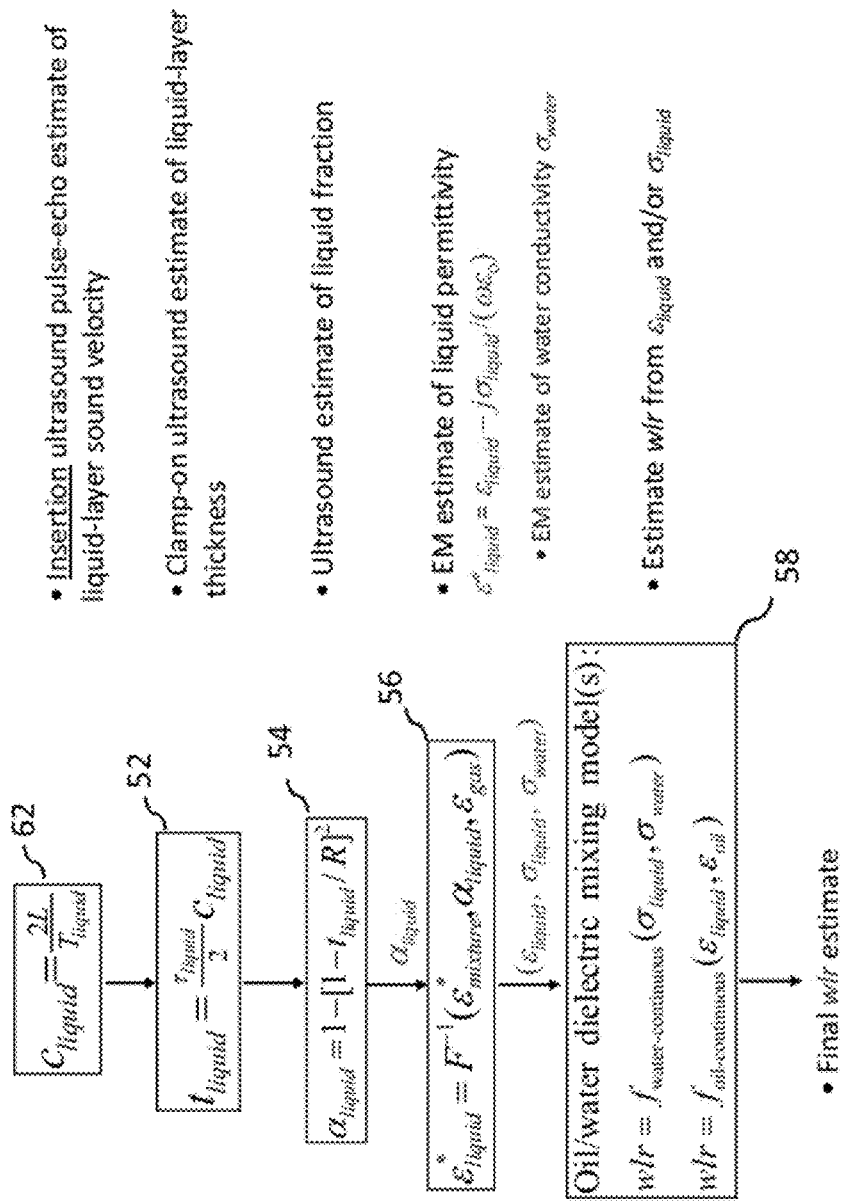
FIG. 3 is another flow chart illustrating another method of measuring a multiphase fluid liquid fraction and water-in-liquid ratio, according to an embodiment of the present invention.

FIG. 3 shows a second embodiment of the method of measurement according to the present invention. This involves a direct measurement of the speed of sound in the liquid phase ($c_{liquid}$) as shown in box 62 by the use of an insertion pulse-echo probe shown in FIG. 1a which, together with the liquid-layer time of flight information ($\tau_{liquid}$) obtainable from the clamp-on ultrasound sensor(s) at the constriction, can yield a direct measurement of the thickness of the liquid ($t_{liquid}$), as shown in box 52. The calculation procedure then proceeds in the same way as described above in FIG. 2 through boxes 54 to 58. However, as the value of the speed of sound in liquid was directly measured substantially in situ, the output from box 58 is the final calculated water-in-liquid ratio estimate and no iterative procedure is necessary.

Figure 1B:
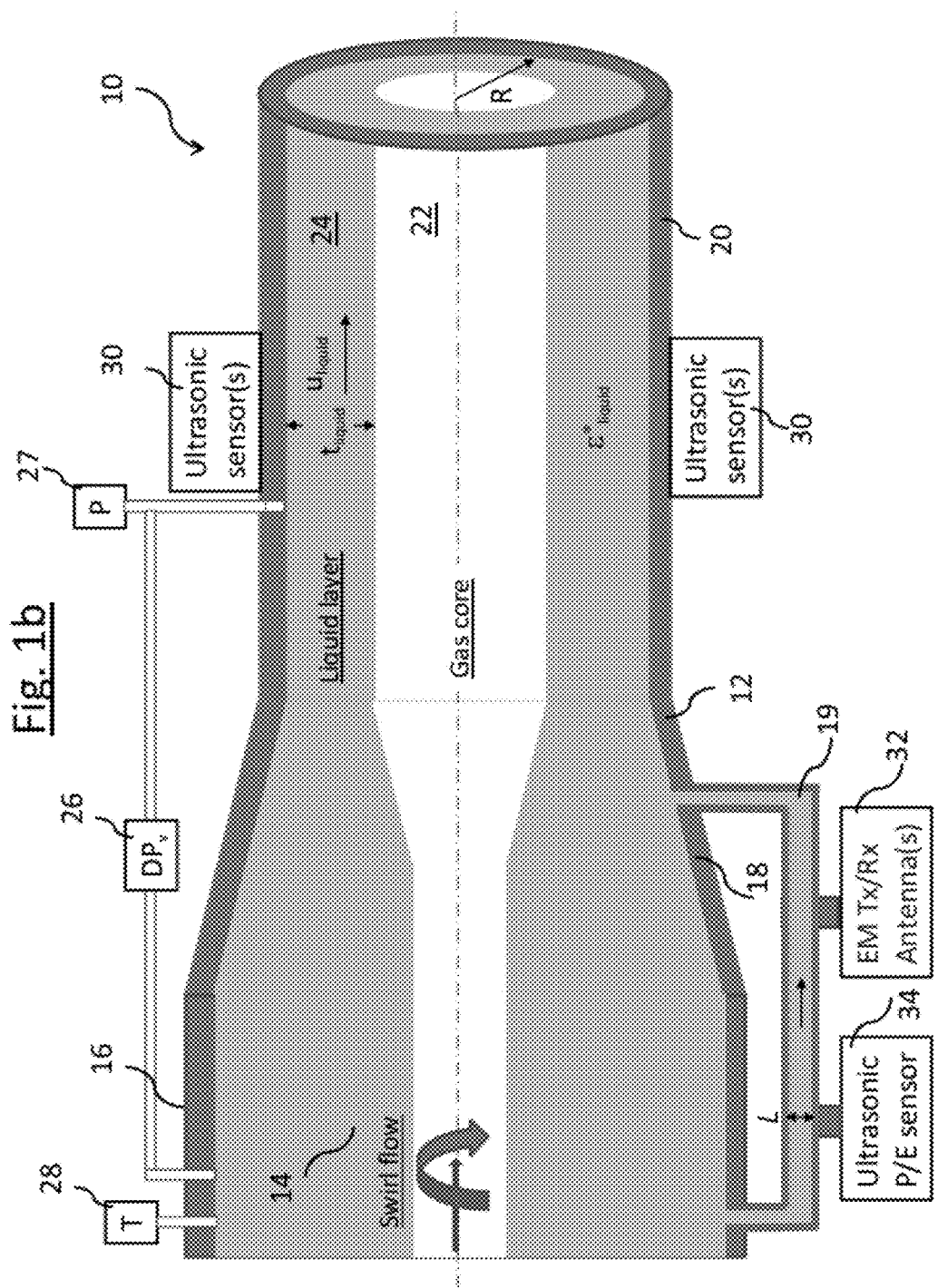
FIG. 1b is a schematic section side view of a multiphase flowmeter according to an embodiment of the present invention.
Figure 4:
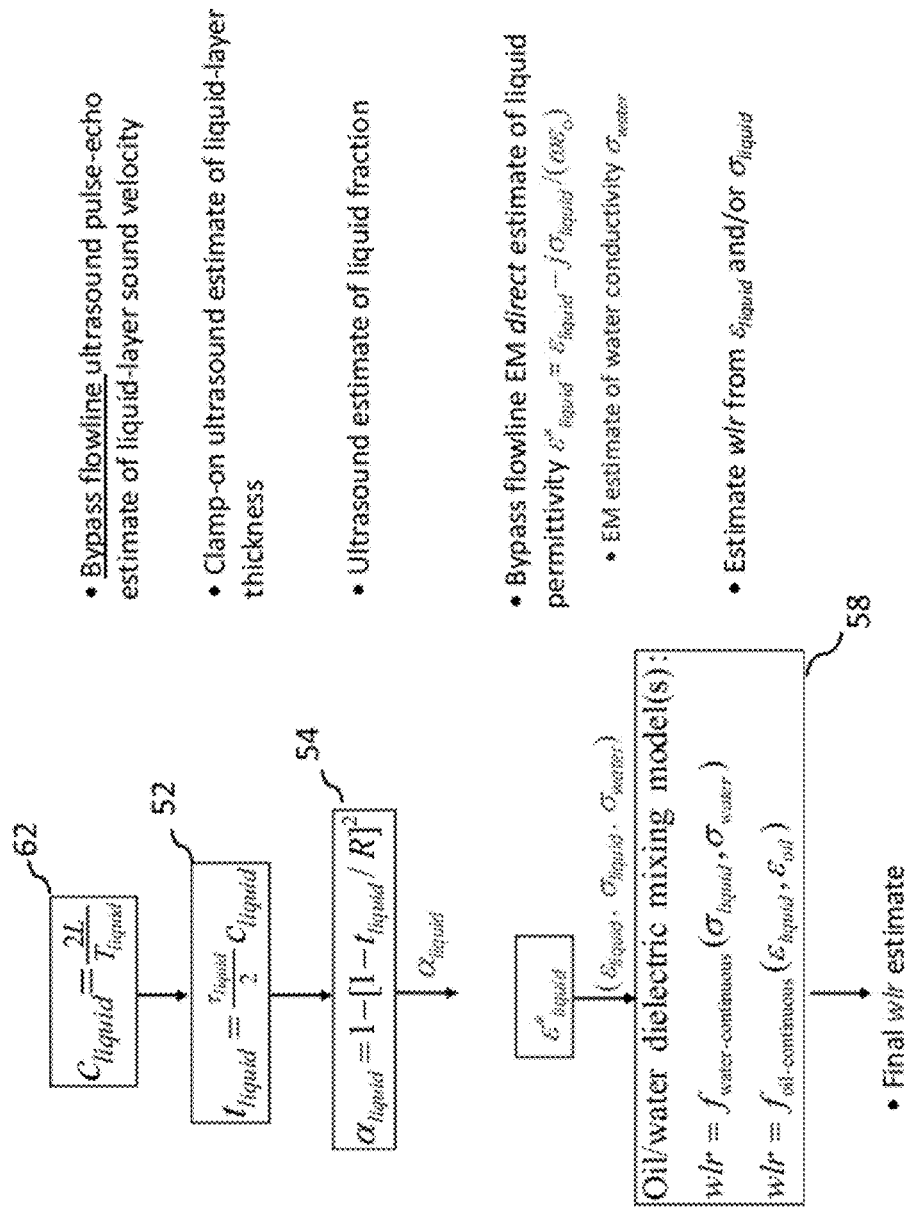
FIG. 4 is another flow chart illustrating another method of measuring a multiphase fluid liquid fraction and water-in-liquid ratio, according to an embodiment of the present invention.

FIG. 4 shows another embodiment of the method of measurement according to the present invention. This involves another direct measurement of the speed of sound in the liquid phase ($c_{liquid}$) as shown in box 62 by the use of liquid-flow bypass flowline pulse-echo probe shown in FIG. 1b which, together with the liquid-layer time of flight information ($\tau_{liquid}$) obtainable from the clamp-on ultrasound sensor(s) at the constriction, can yield a direct measurement of the thickness of the liquid ($\tau_{liquid}$), as shown in box 52, and then a direct measurement of the liquid fraction as shown in box 54. A direct measurement of the permittivity and/or conductivity of the gas-free, representative liquid in the bypass flowline by the use of electromagnetic sensor(s) therein (as shown in FIG. 1b) allows a direct measure of the water-in-liquid ratio of the liquid as shown in box 58. The value of the speed of sound in liquid is not required for the calculation of the water-in-liquid ratio in this embodiment.

Figure 5:
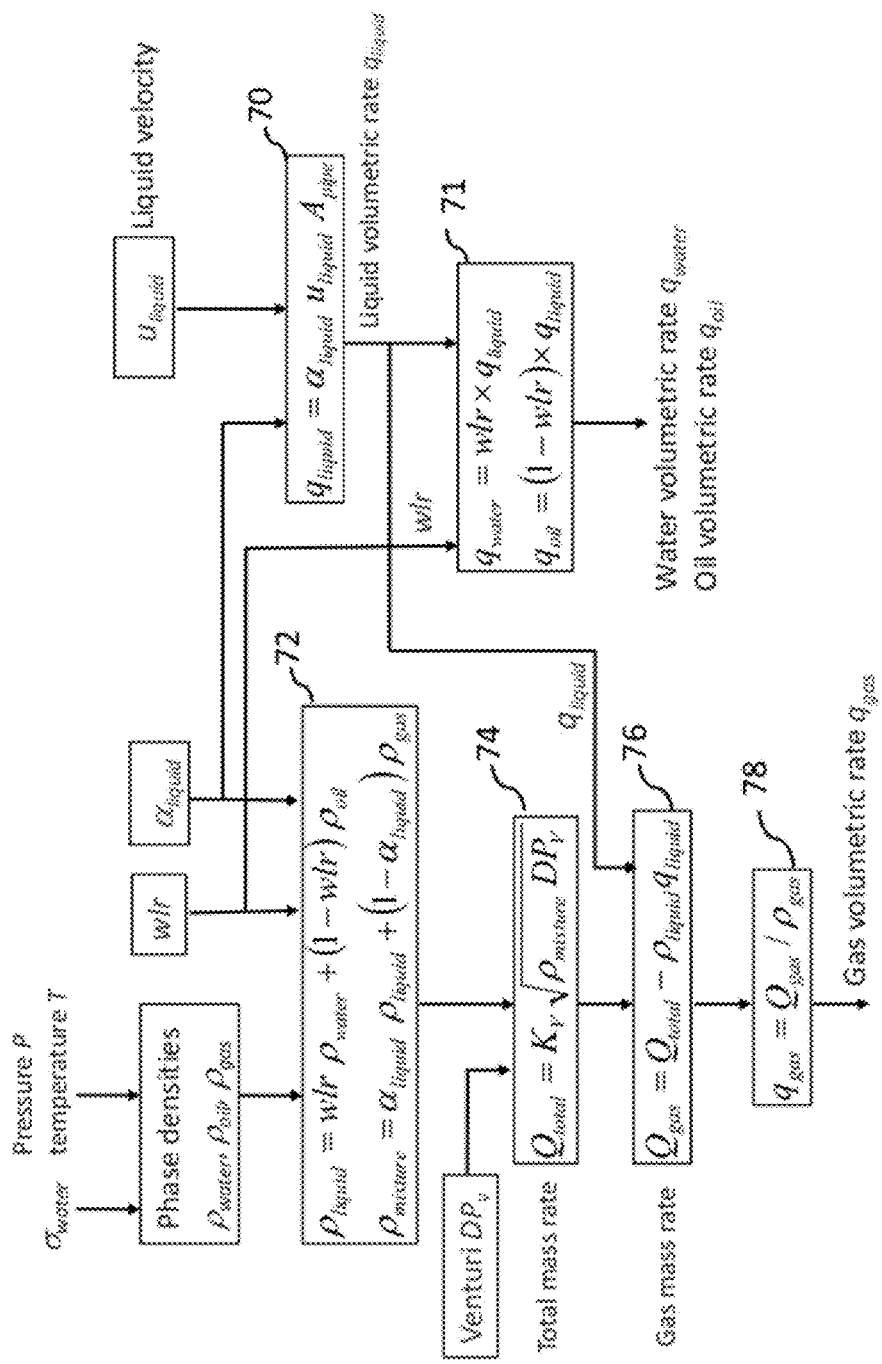
FIG. 5 is a flow chart illustrating a method of measuring a multiphase fluid gas, water and oil flow rates, according to an embodiment of the present invention.

Having obtained measurements of the liquid holdup ($\alpha_{liquid}$) and the water-in-liquid ratio (wlr) from the above-mentioned embodiments, of the venturi differential pressure $DP_v$, and of the liquid-layer axial velocity ($u_{liquid}$) preferably from ultrasound pulsed Doppler sensor(s), the steps of calculating the volumetric flow rates of gas, oil and water are shown in FIG. 5. The calculation in box 70 combines the measured liquid fraction and the measured liquid-layer axial velocity to obtain the liquid volumetric flow rate ($q_{liquid}$). The calculations in box 71 further combine the measured water-in-liquid-ratio and the liquid flow rate to obtain the water volumetric flow rate ($q_{water}$) and the oil volumetric flow rate ($q_{oil}$).

The calculations in box 72 combine the measured liquid fraction and the water-in-liquid ratio to obtain the liquid density and then overall gas-liquid mixture density, given the densities of the gas, oil and water phases. In the water-salinity change situations, the water-density ($\rho_{water}$) change may be corrected for on-line by the estimated water conductivity ($\sigma_{water}$) that is obtained from electromagnetic measurement of the mixture permittivity and mixture conductivity, as indicated in FIGS. 2, 3 and 4.

From the measured differential pressure and the gas-liquid mixture density, the calculation in box 74 obtains the total mass flow rate through the use of venturi flow model. A gas volumetric flow rate can then be calculated in boxes 76 and 78 from the calculated total flow rate and the calculated liquid flow rate.

While the principles of the disclosure have been described above in connection with specific apparatuses and methods, it is to be clearly understood that this description is made only by way of example and not as limitation on the scope of the invention.

The invention claimed is:

1. A method of measuring a property of a multiphase fluid, the multiphase fluid including a gas phase and a liquid phase and the liquid phase comprising at least one of oil and water, travelling through a conduit, wherein the liquid phase travels substantially along an inside-wall of the conduit, the method comprising:

using a mixing rule and a notional water-in-liquid ratio to estimate a speed of sound in the liquid phase;

measuring a thickness of the liquid mixture using the estimated speed of sound;

measuring at least one of a permittivity and a conductivity of a portion of the multiphase fluid;

combining the thickness measurement with the at least one of the permittivity and the conductivity measurement to obtain a derived value for at least one of the permittivity and the conductivity of the liquid mixture;

using at least one of the derived permittivity and the derived conductivity and a relationship between a single phase liquid property and a corresponding two-phase property of the liquid mixture to obtain a calculated water-to-liquid ratio of the liquid mixture; and comparing the calculated water-in-liquid ratio to the notional water-in-liquid ratio;

using the comparison of the calculated water-in-liquid ratio to the notional water-in-liquid ratio to adjust the notional water-in-liquid ratio; and repeating the steps of the present method iteratively using the adjusted notional water-in-liquid ratio until the notional water-in-liquid ratio is approximately equal to the calculated water-in-liquid ratio.

2. A method according to claim 1, further comprising flowing the multiphase fluid through a venturi, wherein the venturi comprises a constriction region.

3. A method according to claim 2, further comprising inducing the multiphase fluid to exhibit swirling flow in the constriction region.

4. A method according to claim 1, wherein the thickness of the liquid mixture is measured using an ultrasonic sensor.

5. A method according to claim 1, further comprising measuring the speed of sound in the multiphase fluid.

6. A method according to claim 5, wherein the speed of sound is measured in-line or in a bypass flowline.

7. A method according to claim 1, wherein the at least one of the permittivity and the conductivity is measured by at least one of a transmission and a reflection electromagnetic method.

8. A method according to claim 1, wherein water conductivity is employed in the calculation of the water-in-liquid ratio of water continuous liquid.

9. A method according to claim 8, wherein water conductivity is estimated from at least one of the measurement of the permittivity and the measurement of the conductivity of the multiphase mixture.

10. A method according to claim 1, wherein the single phase liquid property is at least one of permittivity and conductivity.

11. A method according to claim 1, further comprising the step of determining a flow rate of the liquid mixture.

12. A method according to claim 11, wherein the flow rate is determined obtainable from an axial velocity and the thickness of the liquid mixture.

13. A method according to claim 11, wherein the axial velocity and the thickness of the liquid mixture are measured using an ultrasonic sensor.

14. A method according to claim 11, wherein the liquid flow rate is combined with the water-in-liquid ratio to give the flow rates of the individual oil and water phases.

15. A method according to claim 1, further comprising the step of measuring a total flow rate of the multiphase fluid.

16. A method according to claim 15, wherein the total flow rate is determined from a venturi differential pressure measurement and a multiphase fluid density obtained from the water-in-liquid ratio and the thickness of the liquid mixture.

17. A method according to claim 15, wherein a liquid flow rate is combined with the total flow rate to give a flow rate of the gas phase.

18. A multiphase flowmeter for measuring properties of a fluid comprising a mixture of at least an oil phase and a water phase travelling through a conduit, wherein the oil and water phases are travelling substantially along an inside wall of the conduit as a liquid mixture, wherein the flowmeter comprises:
    a sensor for measuring a time of flight of a signal traveling through the liquid phase;
    a sensor for measuring at least one of a permittivity and a conductivity of a portion of the multiphase fluid; and
    a processor configured to:
        (1) estimate a speed of sound in the liquid phase of the multiphase mixture using a mixing rule and a notional water-in-liquid ratio;
        (2) determine a thickness of the liquid phase from the time of flight and the speed of sound
        (3) combine the thickness with the at least one of the permittivity and the conductivity measurement to obtain a derived value for at least one of the permittivity and the conductivity of the liquid mixture and to process a calculated water-to-liquid ratio of the liquid mixture using at least one of the derived permittivity and the derived conductivity and a relationship between a single phase liquid property and a corresponding two-phase property of the liquid mixture;
        (4) compare the calculated water-in-liquid ratio to the notional water-in-liquid ratio;
        (5) adjust the notional water-in-liquid ratio using the comparison of the calculated water-in-liquid ratio to the notional water-in-liquid ratio to and
        (6) repeat steps (1) through (4) iteratively until the notional water-in-liquid ratio is approximately equal to the calculated water-in-liquid ratio.

19. A flowmeter according to claim 18, further comprising a venturi, wherein the venturi comprises a constriction region providing a reduced conduit cross-section.

20. A flowmeter according to claim 19, further comprising a swirl generator configured to induce a swirling flow of the fluid through the venturi.

21. A flowmeter according to claim 18, wherein the sensor for measuring the time of flight comprises an ultrasonic sensor.

22. A flowmeter according to claim 18, further comprising an insertion ultrasound sensor for measuring the speed of sound in the liquid mixture.

23. A flowmeter according to claim 22, wherein the insertion ultrasound sensor is located on the conduit-wall at an inlet before a constriction in the conduit.

24. A flowmeter according to claim 18, wherein the sensor for measuring the one of the permittivity and the conductivity comprises a transmission electromagnetic sensor.

25. A flowmeter according to claim 18, wherein the sensor for measuring the one of the permittivity and the conductivity comprises a reflection electromagnetic sensor.

26. A flowmeter according to claim 18, wherein the flowmeter comprises both a transmission and a reflection electromagnetic sensor.

27. A flowmeter according to claim 18, wherein the sensor for measuring the time of flight and the sensor for measuring the one of the permittivity and the conductivity are located at the same axial location on the conduit.

28. A flowmeter according to claim 18, further comprising a sensor for measuring the speed-of-sound in the liquid phase, wherein the speed-of-sound sensor is located with the sensor for measuring the one of the permittivity and the conductivity at a bypass line.

29. A flowmeter according to claim 19, wherein the flowmeter comprises a clamp-on flowmeter that is configured to be fitted to a pipe.

* * * * *